United States Patent [19]

Battice

[11] 4,244,912

[45] Jan. 13, 1981

[54] MOLDING PROCESS USING CURABLE SILICONE RELEASE COMPOSITIONS

[75] Inventor: David R. Battice, Hickory, N.C.

[73] Assignee: Dow Corning Corporation, Midland, Mich.

[21] Appl. No.: 17,227

[22] Filed: Mar. 5, 1979

[51] Int. Cl.$^3$ .................. C08G 77/12; C08G 77/20
[52] U.S. Cl. ............................... 264/338; 264/46.4; 264/46.7; 264/51; 528/15; 528/31; 528/32
[58] Field of Search ............... 264/338, 46.4, 46.7, 264/51, 54; 528/15, 31, 32

[56] References Cited

U.S. PATENT DOCUMENTS

| | | | |
|---|---|---|---|
| 2,811,408 | 10/1957 | Braley | 264/338 |
| 3,020,260 | 2/1962 | Nelson | 528/15 |
| 3,341,646 | 9/1967 | Britain | 264/338 |
| 3,485,662 | 12/1969 | Metevia | |
| 3,684,756 | 8/1972 | Brooks | 260/29.1 SI |
| 3,914,369 | 10/1975 | Modic et al. | 264/338 |
| 3,983,298 | 9/1976 | Hahn et al. | 528/15 |
| 4,057,596 | 11/1977 | Takamizawa et al. | 528/15 |
| 4,123,604 | 10/1978 | Sandford, Jr. | 528/31 |

FOREIGN PATENT DOCUMENTS 624114  7/1961  Canada.
50-124712  10/1975  Japan.

*Primary Examiner*—Jeffery R. Thurlow
*Attorney, Agent, or Firm*—George A. Grindahl

[57] ABSTRACT

An improved molding process is provided which comprises treating a mold surface with certain curable silicone compositions to improve the release of a molded article from the mold. The curable silicone release composition is obtained by mixing a vinyl-endblocked polydiorganosiloxane, a xylene-soluble vinyl-containing resinous polysiloxane, a methylhydrogenpolysiloxane crosslinking agent and a hydrosilylation catalyst. The curable silicone release composition is easily applied to and rapidly cured onto the mold surface and, when cured, provides many easy releases of molded articles such as high resiliency polyurethane foam cushions, polyurethane elastomeric shoe soles and polyester boat hulls.

10 Claims, No Drawings

MOLDING PROCESS USING CURABLE SILICONE RELEASE COMPOSITIONS

BACKGROUND OF THE INVENTION

This invention relates to an improved process for molding articles. More specifically, this invention relates to a molding process comprising an improved mold-coating step that allows the preparation of several molded articles after a single application of a curable silicone release composition to the mold.

The molding of solid articles is a highly successful commercial activity; however, it is an activity with some technical problems.

A prominent technical problem is the tendency of the molded article to stick to the shape-determining surfaces of the mold, thereby interfering with its separation from the mold. This sticking problem is particularly prevalent in molding processes which use liquid, organic molding compositions which are curable to the solid state, such as polyurethanes, unsaturated polyesters and polyepoxides. The liquid state of the molding composition allows it to achieve intimate contact with, and even wet, the shape-determining surfaces of the mold, thereby favoring adhesion of the molded article to said surfaces by a physical process. The curing process of the molding composition is an aggressive chemical process which has the potential of involving the shape-determining surfaces of the mold to some extent, thereby further favoring adhesion of the molded article to said surfaces by a chemical process. For these reasons the molding of articles from curable liquid compositions presents release problems which are much more severe than those encountered during the molding of non-curing compositions, such as thermoplastic materials. Furthermore, in a closed-mold process, wherein the confined curing liquid composition may be subjected to pressure, such as in the preparation of high-resiliency polyurethane foam articles, such as automobile seat cushions, furniture upholstery and impact pads, said adhesion-favoring processes are accentuated.

For over twenty years silicone compositions have been used as mold release agents. However, some of the silicone compositions, such as polysiloxane waxes, greases and fluids, transfer to the molded article during demolding and need to be frequently reapplied to the mold. Other silicone compositions, while not being transferable, lack sufficient abrasion-resistance, either because they are not tough enough or because they do not adhere sufficiently to the mold, and frequently need to be repaired or reapplied in order to obtain molded articles having high fidelity.

Braley, U.S. Pat. No. 2,811,408, teaches that a copolymer of trimethylsiloxane units and SiO$_2$ units, optionally containing an organopolysiloxane, provides excellent release of articles molded from organic and organosilicon plastics when applied to the surface of the mold. However, no provision is made for curing the optional organopolysiloxane, when used, and transfer thereof from the mold surface to the molded article will occur, thereby rendering the surface of the molded article unreceptive to further coating, such as painting. Uncured organopolysiloxane fluid, when used in a mold release composition, also has a tendency to defoam a polyurethane foam composition at the foam-fluid interface, resulting in an undesirable skin on the molded article.

Oppliger, Canadian Pat. No. 624,114, teaches that the use of a cured dimethylpolysiloxane film, adhered to the mold surface, represents an improved way for releasing thin-skinned polyurethane foam articles from metal or paper molds. While a cured dimethylpolysiloxane film is not likely to transfer to the molded article, such a film lacks sufficient abrasion resistance and does not provide improved release of several molded articles without frequent recoating of the mold.

Brooks, U.S. Pat. No. 3,684,756, discloses a resinous mold release composition which is resistant to abrasion and which comprises an alkyl-terminated organopolysiloxane, a partially alkoxylated silicone resin and a metal organic resin-curing catalyst. While this composition is said to give multiple releases of plastic articles from a mold treated therewith, the alkyl-terminated organopolysiloxane possesses no curing sites and is not cured in or co-cured with the resin. Transfer of the uncured alkyl-terminated organopolysiloxane from the mold surface to the surface of the molded article is likely, thus leading to the problems of transfer and defoaming discussed above.

SUMMARY OF THE INVENTION

It is an object of this invention to provide an improved process for molding articles from a liquid molding composition, curable to the solid state. It is another object of this invention to provide an improved process for molding articles which permits the preparation of many articles between consecutive applications of a release agent to the mold. It is another object of this invention to provide an improved process of molding articles which is especially suited for continuous, rapid operation. It is a further object of this invention to provide an improved process for molding articles wherein the release agent does not transfer from the treated mold surface to the molded article. It is also an object of this invention to provide an improved process for molding polyurethane foam articles wherein a mold release agent is used which will not defoam the polyurethane foam.

These and other objects are realized by applying to at least one shape-determining surface of a mold, and thereafter curing, certain fast-curing, tough silicone compositions. Certain of the curable silicone compositions which are useful in the process of this invention have been narrowly exemplified in the curable organosilicon composition art as a marking ink composition and as a repair composition for surface imperfections on translucent silicone rubber articles. Others useful herein appear to be new.

DETAILED DESCRIPTION OF THE INVENTION

This invention relates to an improved process for manufacturing molded articles, said process comprising placing a molding composition in a mold, converting the molding composition to a solid molded article and thereafter separating the solid molded article from the mold, the improvement comprising applying to at least one shape-determining surface of the mold, and thereafter curing, before the molding composition is placed in contact therewith a curable silicone release composition obtained by mixing components consisting essentially of (I) a polydiorganosiloxane having the general formula

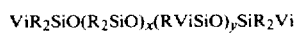

wherein x and y are integers whose sum has an average value sufficient to provide the polydiorganosiloxane with a viscosity at 25° C. of at least 1.0 pascal-second, Vi denotes a vinyl radical and each R denotes, independently a monovalent radical selected from the group consisting of methyl, phenyl and saturated hydrocarbon radicals having from 2 to 6 carbon atoms, the total number of organic radicals in the polydiorganosiloxane consisting of at least 95 percent methyl radicals and no more than 1 percent vinyl radicals, (II) a xylene-soluble copolymer of $(CH_3)_3SiO_{\frac{1}{2}}$, $(CH_3)_2(CH_2\!=\!CH)SiO_{\frac{1}{2}}$ and $SiO_{4/2}$ siloxane units, said copolymer having from 1 to 5 percent by weight of vinyl radicals, based on the weight of the copolymer, and a total of from 0.6 to 1.1 of said $(CH_3)_3SiO_{\frac{1}{2}}$ plus $(CH_3)_2(CH_2\!=\!CH)SiO_{\frac{1}{2}}$ siloxane units for every said $SiO_{4/2}$ siloxane unit, (III) a methylhydrogenpolysiloxane, soluble in the mixture of (I) plus (II), and having an average of at least three silicon-bonded hydrogen radicals per molecule, said hydrogen radicals being bonded to separate silicon atoms, and (IV) a catalytic amount of a hydrosilylation catalyst, said components being mixed in sufficient amounts to provide, in the curable silicone release composition, from 10 to 70 parts by weight of (II) for every 100 parts by weight of (I) plus (II) and from 2 to 10 silicon-bonded hydrogen radicals for every silicon-bonded vinyl radical.

The four essential components, i.e. polydiorganosiloxane (I), xylene-soluble copolymer (II), methylhydrogenpolysiloxane (III) and hydrosilylation catalyst (IV), which are mixed to form the curable silicone composition which is used as a curable release agent in the improved process of the invention are all known, broadly, in the organopolysiloxane art.

Polydiorganosiloxane (I) is a vinyl-endblocked linear polymer having the general formula

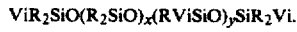

Each R denotes, independently, a methyl radical, a phenyl radical or a saturated hydrocarbon radical having from 2 to 6, inclusive, carbon atoms such as alkyl radicals, such as ethyl, propyl, isopropyl, butyl and hexyl and cycloaliphatic radicals, such as cyclohexyl. At least 95 percent of all organic radicals in (I) are the methyl radical. Preferably each terminal silicon atom of polydiorganosiloxane (I) bears at least one methyl radical. To avoid overcuring of the release composition the total number of vinyl radicals in polydiorganosiloxane (I) should not exceed 1 percent of all of the silicon-bonded organic radicals therein.

Examples of preferred siloxane units which form polydiorganosiloxane (I) include, $ViMe_2SiO_{\frac{1}{2}}$, $PhMeViSiO_{\frac{1}{2}}$, $Me_2SiO_{2/2}$ and $MeViSiO_{2/2}$. Examples of other siloxane units suitable for use in polydiorganosiloxane (I) include $PhViSiO_{2/2}$, $Ph_2SiO_{2/2}$, $PhMeSiO_{2/2}$, $ViEtSiO_{2/2}$ and $MeEtSiO_{2/2}$ siloxane units.

Herein the symbols, Me, Et, Ph and Vi denote, respectively, the methyl, ethyl, phenyl and vinyl radical.

Examples of preferred polydiorganosiloxanes (I) to be used in the process of this invention include

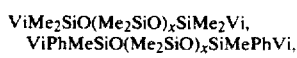

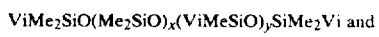

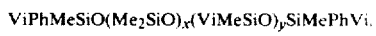

The average value of the sum of x plus y in the above formulae is such that the viscosity of the resulting polydiorganosiloxane is at least 1.0 pascal-seconds (1000 centipoise) at 25° C. Preferred results, such as rapid cure rate of the curable composition and high abrasion resistance of the cured release coating, are obtained when said viscosity of the vinyl-endblocked polydiorganosiloxane is at least 25 pascal-seconds. There is no known upper limit to the viscosity of polydiorganosiloxane (I).

The exact average value for the sum of x plus y which will produce a desired viscosity at 25° C. for polydiorganosiloxane (I) depends upon the amounts and types of R radicals present therein and is difficult to predict. However, for the above-delineated preferred vinyl-endblocked polydiorganosiloxanes, an average value for x plus y of approximately 225 will provide a viscosity of 1.0 pascal-seconds and an average value of approximately 695 will provide a viscosity of 25 pascal-seconds, both measured at 25° C.

Polydiorganosiloxanes (I) are well known in the organosilicon polymer art and may be prepared by any suitable method. While the preparation of polydiorganosiloxane (I) needs no further elaboration here, it should be noted that, depending upon the particular polydiorganosiloxane (I) that is prepared and the particular method for its preparation that is used, there may be co-produced therewith approximately 0 to 15 percent by weight of cyclopolydiorganosiloxanes. A large portion of said cyclopolydiorganosiloxanes may be volatile at temperatures up to 150° C. It is to be noted that the suitability of vinyl-endblocked polydiorganosiloxane (I) for use in the process of this invention is determined by its viscosity at 25° C., as delineated above, and does not depend upon the presence or absence therein of the above-described amounts of co-produced cyclopolydiorganosiloxanes. That is to say, vinyl-endblocked polydiorganosiloxane (I) may be optionally freed of any volatile cyclopolydiorganosiloxanes, if desired, without having a detrimental effect on the process of this invention.

For the purposes of this invention however, the viscosity and the amount of vinyl-endblocked polydiorganosiloxane (I) that is used, and which is further delineated below, are based on polydiorganosiloxane which has been devolatilized at 150° C. for 1 hour.

While polydiorganosiloxane (I) is stated to be linear and to bear only hydrocarbon radicals on silicon, it is within the scope and spirit of this invention to permit the presence therein of trace amounts of non-linear siloxane units i.e. $SiO_{4/2}$ $ViSiO_{3/2}$ and $RSiO_{3/2}$ siloxane units wherein R is as denoted above, and trace amounts of other silicon-bonded radicals, such as hydroxyl and alkoxyl, which are normally incidentally present in commercial polydiorganosiloxanes. Preferably polydiorganosiloxane (I) is free of said non-linear siloxane units and said other radicals.

The xylene-soluble copolymer (II) of $(CH_3)_3SiO_{\frac{1}{2}}$ siloxane units, $(CH_3)_2(CH_2\!=\!CH)SiO_{\frac{1}{2}}$ siloxane units and $SiO_{4/2}$ siloxane units is well known in the organosilicon polymer art. Said copolymer is a solid, resinous material which is prepared as, and usually, but not necessarily, used as, a solution in an organic solvent. Typical solvents that are used with copolymer (II) include benzene, toluene, xylene, methylene chloride, perchloroethylene and naphtha mineral spirits.

Copolymer (II) contains from 1 to 5, preferably 1.5 to 3.5, percent by weight of vinyl radicals, based on the weight of the copolymer, and from 0.6 to 1.1 of the siloxane units bearing organic radicals for every SiO$_{4/2}$ siloxane units. Thus, in copolymer (II), for every SiO$_{4/2}$ unit there is a total of from 0.6 to 1.1 (CH$_3$)$_3$SiO$_{\frac{1}{2}}$ units plus (CH$_3$)$_2$(CH$_2$=CH)SiO$_{\frac{1}{2}}$ units.

Copolymer (II) is preferably prepared by an adaptation of the procedure described by Daudt et al. in U.S. Pat. No. 2,676,182 whereby a silica hydrosol is treated at low pH with a source of trimethylsiloxane units, such as hexamethyldisiloxane or trimethylchlorosilane and a source of dimethylvinylsiloxane units, such as divinyltetramethyldisiloxane or dimethylvinylchlorosilane. Alternatively, a suitable mixture of hydrolyzable trimethyl-substituted-, dimethylvinyl-substituted and organic-radical-free-silanes, such as chlorosilanes and/or alkoxysilanes, may be cohydrolyzed. In this alternate procedure the resulting cohydrolyzate is preferably subsequently treated with a suitable silylating agent, such as hexmethyldisilazane or divinyltetramethyldisilazane, to reduce the hydroxyl content of the resulting resinous copolymer to less than 1 percent by weight.

Methylhydrogenopolysiloxane (III) operates as a curing agent for the mixture of polydiorganosiloxane (I) and xylene-soluble copolymer (II) and therefore must be soluble therein and must contain an average of at least three, preferably more than three, silicon-bonded hydrogen radicals per molecule. By the name, methylhydrogenopolysiloxane, it is meant that at least three, but preferably all, silicon atoms therein which bear the hydrogen radicals also bear at least one methyl radical. For efficient curing of the mixture of (I) plus (II), it is preferred that no silicon atom in (III) bear more than one silicon-bonded hydrogen radical. Methylhydrogenpolysiloxane (III) may also contain silicon-bonded phenyl radicals and silicon-bonded alkyl radicals having from 2 to 6 carbon atoms, provided that it is soluble in the mixture of (I) plus (II).

Methylhydrogenpolysiloxane (III) is preferably a fluid having a low viscosity, such as less than 0.1 pascal-seconds at 25° C., thereby considerably and desirably decreasing the initial, i.e. uncatalyzed, viscosity of the mixture of polydiorganosiloxane (I) and copolymer (II) when mixed therewith. It is desirable to decrease the viscosity of the mixture of (I) plus (II) because application of the resulting curable composition onto, and adhesion of the subsequently cured composition to, a mold surface is aided thereby. The viscosity of the mixture of (I) plus (II) can be considerably decreased by the use of a low viscosity methylhydrogenpolysiloxane as component (III) because the curable silicone compositions which are uniquely operative in the process of this invention have an unusually high ratio of silicon-bonded hydrogen radicals to silicon-bonded vinyl radicals, further delineated below, thereby permitting the use of relatively large amounts of any particular methylhydrogenpolysiloxane (III).

Preferred siloxane units which form the methylhydrogenpolysiloxane (III) include Me$_3$SiO$_{\frac{1}{2}}$, Me$_2$HSiO$_{\frac{1}{2}}$, Me$_2$SiO$_{2/2}$, MeHSiO$_{2/2}$, MeSiO$_{3/2}$, and SiO$_{4/2}$. Methylhydrogenpolysiloxane (III) may also further comprise other siloxane units, such as HSiO$_{3/2}$, PhHSiO$_{2/2}$, PhMeHSiO$_{\frac{1}{2}}$, PhMeSiO$_{2/2}$ and PhSiO$_{3/2}$, provided that the resulting methylhydrogenopolysiloxane is soluble in the mixture of (I) plus (II).

Examples of methylhydrogenopolysiloxane (III) which are operative in the process of this invention include, but are not limited to, siloxanes consisting of Me$_3$SiO$_{\frac{1}{2}}$ units and MeHSiO$_{2/2}$ units, siloxanes consisting of Me$_3$SiO$_{\frac{1}{2}}$ units, Me$_2$SiO$_{2/2}$ units and MeHSiO$_{2/2}$ units, siloxanes consisting of HMe$_2$SiO$_{\frac{1}{2}}$ units, Me$_2$SiO$_{2/2}$ units and MeHSiO$_{2/2}$ units, siloxanes consisting of SiO$_{4/2}$ units, Me$_3$SiO$_{\frac{1}{2}}$ units and HMe$_2$SiO$_{\frac{1}{2}}$ units, siloxanes consisting of SiO$_{4/2}$ units and HMe$_2$SiO$_{\frac{1}{2}}$ units, siloxanes consisting of HMeSiO$_{2/2}$ units and siloxanes consisting of HMeSiO$_{2/2}$ units and Me$_2$SiO$_{2/2}$ units.

Specific examples of suitable methylhydrogenpolysiloxanes that may be used as component (III) in the process of this invention include (HMe$_2$SiO)$_4$Si, (MeHSiO)$_4$, MeSi(OSiMe$_2$H)$_3$, PhSi(OSiMe$_2$H)$_3$ and, preferably, higher molecular weight fluid siloxanes having the average formulae Me$_3$SiO(MeHSiO)$_{35}$SiMe$_3$, Me$_3$SiO(Me$_2$SiO)$_3$(MeHSiO)$_5$SiMe$_3$ and HMe$_2$SiO(Me$_2$SiO)$_3$(MeHSiO)$_5$SiMe$_2$H. The higher molecular weight methylhydrogenpolysiloxanes are preferred as a curing component for a silicone release composition when said composition is applied to a hot surface of a mold because said higher molecular weight methylhydrogenpolysiloxanes have a low volatility and will remain with and more effectively cure the silicon release composition at elevated temperatures.

Methylhydrogenopolysiloxanes are well known in the organosilicon polymer art; their preparation therefore needs no further elaboration here. As in the case of the preparation of vinyl-endblocked polydiorganosiloxanes, it should be noted that the preparation of methylhydrogenopolysiloxanes comprising diorganosiloxane units may co-provide small amounts of cyclopolydiorganosiloxanes. The presence or absence of these cyclopolydiorganosiloxane species in the methylhydrogenpolysiloxane is of no importance to this invention as long as the methylhydrogenpolysiloxane has an average of at least 3 silicon-bonded hydrogens per molecule.

Component (IV) is any hydrosilylation catalyst that is effective to catalyze the addition reaction of silicon-bonded hydrogen radicals with silicon-bonded vinyl radicals in the well-known manner. Typically, component (IV) is an active-metal-containing composition such as a platinum-containing compound or a rhodium-containing compound. Examples of these active-metal compositions include chloroplatinic acid, platinum deposited on a substrate, platinum complexed with organic liquids, such as ketones, vinylsiloxanes and ethylene, and complexes of rhodium halides. Preferably the hydrosilylation catalyst is soluble in the curable silicone release composition.

The platinum-containing catalysts may also contain an inhibitor to moderate its catalytic activity at room temperature, in the well-known manner, if desired. Rhodium-containing catalysts do not need room-temperature-inhibiting.

Hydrosilylation catalysts and their inhibitors are well known in the organosilicon art and need no further delineation herein. For further details, if needed, the reader is directed to the teachings of Speier et al., U.S. Pat. No. 2,823,218; Willing, U.S. Pat. No. 3,419,593; Kookootsedes et al., U.S. Pat. No. 3,445,420; Chandra, U.S. Pat. No. 3,890,359 Polmanteer et al., U.S. Pat. No. 3,697,473; Nitzsche et al., U.S. Pat. No. 3,814,731; and Sandford, U.S. Pat. No. 4,123,604.

The vinyl-containing components of the curable silicone release composition are mixed in amounts sufficient to provide from 10 to 70 parts by weight of the xylene-soluble copolymer (II) for every 100 parts by weight of the mixture of vinyl-endblocked polydiorganosiloxane (I) plus copolymer (II). A preferred combination of properties, for the cured release agent, such as excellent polyurethane foam release force and high film strength, is obtained when the curable composition contains a mixture of (I) and (II) which is from 20 to 60 percent by weight component (II).

The desired amounts of (I) and (II) are used on a non-volatile basis. This is easily achieved by subjecting samples of the polydiorganosiloxane, which frequently contains volatile cyclopolydiorganosiloxanes, and xylene-soluble copolymer, which is usually prepared and handled in xylene, to a devolatization procedure at 150° C. for 1 hour to determine the non-volatile content of each and using a sufficient quantity of each material to obtain the desired amount of the vinyl-endblocked polydiorganosiloxane (I) and xylene-soluble copolymer (II) in the curable composition.

The amount of methylhydrogenopolysiloxane (III) to be mixed when preparing the curable silicone release composition is merely the amount that will provide from 2 to 10 silicon-bonded hydrogen radicals for every silicon-bonded vinyl radical in the composition. A preferred value for this ratio of hydrogen radicals to vinyl radicals is from 2 to 5 wherein the hydrogen gassing, sometimes observed at higher ratios, is usually avoided.

The number of said silicon-bonded hydrogen radicals and said silicon-bonded vinyl radicals should be measured by suitable analytical techniques.

The amount of hydrosilylation catalyst to be used in the curable silicone release composition is merely that amount that will catalyze the addition of silicon-bonded hydrogen to silicon-bonded vinyl and provide the desired cure time at a particular curing temperature for the curable silicone release compositions. A suitable catalytic amount of hydrosilylation catalyst can be determined by simple experimentation. A composition-soluble, platinum-containing catalyst is typically used in sufficient amount to provide from 0.5 to 20 parts by weight of platinum for every one million parts by weight of components (I) plus (II) plus (III). A composition-soluble, rhodium-containing catalyst is typically used in sufficient amount to provide from 5 to 40 parts per million of rhodium, on the same weight basis.

The curable silicone release composition may further contain up to 95 percent by weight, based on the weight of the curable composition, of a volatile thinning medium having a normal boiling point of less than 150° C., such as a dispersant or a solvent, to aid in mixing and using said composition, if desired. Conveniently, said thinning medium is the solvent in which the xylene-soluble copolymer (II) is normally prepared and handled. Organic thinning media should be free of aliphatic unsaturation.

In a preferred embodiment of this invention the curable silicone release composition has a viscosity which permits its application to a mold surface by spraying. Depending on the particular spray equipment that is used, a sprayable composition may have a viscosity of from 0.1 to 10 pascal-seconds at 25° C. Because of the relatively large amount of low-viscosity methylhydrogenpolysiloxane curing agent (III) that may be used in the process of this invention, certain of the curable silicone release compositions described above may be sprayable without incorporating a volatile thinning medium. However, in a preferred curable silicone release composition, wherein the polydiorganosiloxane (I) has a viscosity of at least 25 pascal-seconds and the methylhydrogenopolysiloxane (III) provides from 2 to 5 hydrogen radicals for every vinyl radical, a volatile thinning medium is preferably incorporated therein to provide sprayability thereto.

The curable silicone release composition may further contain additional components which do not adversely interfer with the curing of the composition or its use as a release agent, such as a colorant to aid in its application to a mold surface.

The curable silicone release composition is prepared by mixing the desired amounts of the four essential components and any additional components in any suitable manner such as by stirring, blending and/or tumbling and in any suitable order. Preferably the methylhydrogenpolysiloxane (III) and the hydrosilylation catayst (IV) are brought together in a final mixing step.

For example, the curable silicone release composition can be conveniently prepared by preparing two non-curing compositions which, when blended in proper proportions, will give rise to the curable silicone release composition. Typically, one of said non-curing compositions comprises a portion of the polydiorganosiloxane (I), the xylene-soluble copolymer (II), optionally containing its processing solvent such as xylene, and the methylhydrogenpolysiloxane (III) and another of said non-curing compositions comprises the balance of the polydiorganosiloxane (I) and the hydrosiliylation catalyst (IV) and any inhibitor. Alternately, one of non-curing compositions may comprise all of the components except the methylhydrogenpolysiloxane, which constitutes another non-curing composition to be mixed with the first non-curing composition at the proper time.

In a preferred method for preparing the curable silicone release composition, said mixing is accomplished while the resulting mixture is being applied to a surface of a mold, using well-known spray-mixing techniques. In such a method it is preferred that the curable composition and the mixtures that are mixed to form the curable composition have a viscosity of less than 1.0 pascal-second at 25° C. Alternately, said mixing may be accomplished shortly before the release composition is to be applied to a mold surface, such as within five minutes before use, when an uninhibited platinum-containing catalyst is used.

The curable silicone release composition may be applied to a shape-determining surface of a mold by any suitable method such as by spraying, brushing or rolling. The composition of said surface is not critical and may be metal, wood, polyester, epoxy, etc. To ensure proper curing and adhesion of the curable silicone release composition the surface to which it is applied should be clean and free of materials which undesirably inhibit the cure of the release composition, such as materials containing amines, mercaptans and phosphines.

After being applied, the curable silicone release composition is allowed to cure and any volatile thinning medium is allowed to evaporate. Preferably said curing and evaporating are accelerated by the application of heat to the applied composition. Said heating can be accomplished by heating the mold to which the release composition is applied and/or by externally applying heat to the applied composition. The curable silicone release composition should not be heated much above room temperature before it is applied because it will rapidly gel and become unusable.

The process of this invention is applicable to open-mold or closed-mold molding processes and to molding processes which use solid molding compositions, such as thermoformable powders and blanks or liquid molding compositions which are convertible to the solid state by any means, such as by a chemical curing reaction or by simple cooling of a molten composition, such as wax, polyethylene or low-melting metals.

The improvement of this invention is particularly valuable in a molding process wherein a liquid organic molding composition is converted to the solid state by a chemical reaction, such as by a reaction involving isocyanate radicals which is used to provide polyurethane articles such as polyurethane elastomers and high resiliency polyurethane foams or by a reaction involving free radicals which is used to provide polyester articles such as boat hulls. These chemically hardened molding compositions are readily released from a mold that has been treated by the process of this invention.

In the improved process of this invention at least one shape-determining surface of the mold is coated with the curable silicone release composition. For example, in a two-surfaced mold, such as a closable mold, one surface of the mold may be coated as described herein and the other surface may be left uncoated or may be coated by another process, thereby providing surfaces having different release forces. Differential release of molded articles produced therein is thereby obtained. Preferably, all the shape-determining surfaces of the mold are coated by the process of this invention. In addition, any other portions of the mold such as flashing areas, injection conduits and risers, or portions thereof, may be treated in the process of this invention, if desired.

The curable silicone release compositions which are used in the process of this invention are uniquely suited for a commercial molding process because they are easily applied, they cure rapidly at relatively low temperature and they have physical properties which provide for the multiple use of the mold with one coating of the mold.

The process of this invention is particularly useful in a continuous molding process wherein a plurality of hot molds are sequentially charged with a molding composition, the charged composition is converted to a molded article and the molded article is separated from the hot mold, thereby allowing the mold to be refilled with molding composition. In such a continuous process a mold to be treated by the process of this invention may be sprayed with the curable silicone release composition, instead of being charged with the molding composition, and the applied release composition is cured during the time interval when the charged mold would normally be in the conversion and/or demolding stage. The treated mold is then ready for charging during the next sequence. In this molding process the process of this invention is advantageous because the curable silicone release composition cures rapidly when applied to a shape-determining surface of the hot mold and because the cured silicone release composition has sufficient abrasion-resistance and adhesion to the mold surface to permit the molding of several articles after one application of the curable silicone release composition.

Furthermore, the curable silicone release compositions that are used in the improved process of this invention are particularly useful in a molding process which uses "cold-molded" polyurethane compositions. In such a process a mold is heated to and maintained at approximately 60° C. for the entire molding process. To take full advantage of a continuous "cold-mold" molding process the process of this invention provides for a curing of the silicone release composition at the operating temperature of the molding process, in one cycle, and does not require a separate heating step.

The invention having been fully described, it will now be exemplified, but not limited, by the following examples which also include the best mode for practicing the invention.

For this disclosure all viscosities were measured in centipoise at 25° C. and were converted to pascal-seconds by multiplying by 0.001 and rounding off. All parts, percentages and ratios are by weight unless otherwise indicated.

EXAMPLE 1

The base compositions and the catalysts compositions that were used to prepare release agents, and which are listed in Table I and Table II, respectively, were prepared by mixing the indicated amounts of polydiorganosiloxane, resin copolymer solution and either the methylhydrogenpolysiloxane or the platinum-containing catalyst.

The polydiorganosiloxane consisted of 86.3 percent of a methylphenylvinylsiloxane-endblocked polydimethylsiloxane having a viscosity of approximately 62 pascal-seconds at 25° C. and 13.7 percent of volatile cyclic polydimethylsiloxanes. The resin copolymer solution consisted of 32.9 percent xylene and 67.1 percent of a resin copolymer having $(CH_3)_3SiO_{\frac{1}{2}}$, $(CH_3)_2(CH_2=CH)SiO_{\frac{1}{2}}$ and $SiO_{4/2}$ siloxane units wherein the mol ratio of the sum of the methyl- and vinyl-bearing siloxane units to the $SiO_{4/2}$ siloxane units had a value of 0.7 and the vinyl content was 1.7 percent. The methylhydrogenpolysiloxane had the average formula $Me_3SiO(Me_2SiO)_3(MeHSiO)_5SiMe_3$. The platinum-containing catalyst was a complex of $H_2PtCl_6 \cdot 6H_2O$ and divinyltetramethyldisiloxane, prepared according to U.S. Pat. No. 3,419,593, and containing 0.6 percent platinum.

Release agents, designated by letters A through J in Table III, were prepared by mixing equal portions of each of the identically lettered base and catalyst composition described in Table I and II and refined naphtha mineral spirits. The amount of volatile thinning agent (xylene plus naphtha) ranged from a low of 38.3 percent for release agent C to a high of 47.2 percent for release agent H. Volatile cyclopolydimethylsiloxane content ranged from a low of 2.7 percent for release agent J to a high of 6.8 percent for release agent A.

The release agents were sprayed on one surface of 2 mil-thick aluminum panels and the coated panels were heated for 6 minutes at 60° C. to cure the release agent. The thickness of the resulting coating was approximately 2 mils. High-resiliency polyurethane foam was then spread on the coated surface of the panels and the free-molded foam was post-cured according to the manufacturer's recommendations. The foam-bearing panels were then cut into 2 inch wide strips and the force needed to pull the flexible aluminum panel from the high-resiliency polyurethane foam at a speed of 12 inches/minute and at an angle of 180° ($\pi$ radius) was measured with a Keil Tester. For this disclosure this force (grams force/2 inches) was converted to newtons per meter (N/m) by dividing by 2, multiplying by 0.3860885 and rounding off, and are recorded in Table III. A foam-bearing control (untreated) panel had a release value of from 193 to 270 N/m. The panel prepared by the process of this invention releases high-resiliency foam, according to this test, with a force of less than 20 N/m.

Pot life, recorded in Table III, was noted as the elapsed time, in minutes at 25° C., between the preparation and the gelation of the release agent.

fore the release agent experienced abrasion that needed repair.

TABLE I

| Base Components | Base Compositions (Parts) | | | | | | | | | |
|---|---|---|---|---|---|---|---|---|---|---|
| | A | B | C | D | E | F | G | H | I | J |
| Polydiorganosiloxane + Volatiles | 92.6 | 92.6 | 92.6 | 69.5 | 69.5 | 69.5 | 69.5 | 46.3 | 46.3 | 46.3 |
| Resin Copolymer + Xylene | 29.8 | 29.8 | 29.8 | 59.6 | 59.6 | 59.6 | 59.6 | 89.4 | 89.4 | 89.4 |
| Methylhydrogenpolysiloxane | 4.1 | 10.3 | 16.4 | 7.4 | 18.6 | 29.6 | 74.2 | 10.7 | 26.8 | 43.0 |

TABLE II

| Catalyst Components | Catalyst Composition (Parts) | | | | | | | | | |
|---|---|---|---|---|---|---|---|---|---|---|
| | A | B | C | D | E | F | G | H | I | J |
| Polydiorganosiloxane + Volatiles | 92.6 | 92.6 | 92.6 | 69.5 | 69.5 | 69.5 | 69.5 | 46.3 | 46.3 | 46.3 |
| Resin Copolymer + Xylene | 29.8 | 29.8 | 29.8 | 59.6 | 59.6 | 59.6 | 59.6 | 89.4 | 89.4 | 89.4 |
| Platinum-containing Catalyst | 0.8 | 0.8 | 0.8 | 0.8 | 0.8 | 0.8 | 0.8 | 0.8 | 0.8 | 0.8 |

TABLE III

| Release Agent | | | Properties | |
|---|---|---|---|---|
| Designation | Polydiorganosiloxane (Parts) Resin Copolymer (Parts) | Si—H (Mols) Si-Vinyl (Mols) | Pot Life (min.) | Polyurethane Foam Release (N/m) |
| A[1] | 80/20 | 1/1 | >150 | 21.2 to 23.2 |
| B | " | 2.5/1 | 60 | 0 |
| C | " | 4/1 | 28 | <3.9 |
| D[1] | 60/40 | 1/1 | >150 | 115.8 |
| E | " | 2.5/1 | 77 | 17.4 |
| F | " | 4/1 | 23 | 3.9 to 15.4 |
| G | " | 10/1 | 12 | 11.6 to 23.2 |
| H[1] | 40/60 | 1/1 | >150 | 173 to 212 |
| I | " | 2.5/1 | 45 | 9.7 |
| J | " | 4/1 | 52 | 5.8 |

[1] For comparative purposes

EXAMPLE 2

A release agent was prepared by mixing approximately 100 parts of methylene chloride, 38.35 parts of a polydiorganosiloxane consisting of 9 percent polydimethylsiloxane cyclics and 91 percent of a methylphenylvinylsiloxane-endblocked polydimethylsiloxane having a viscosity of approximately 65 pascal-seconds at 25° C., 80 parts of a xylene solution of the resin copolymer of Example 1, said solution consisting of 34.5 percent xylene and 65.5 percent resin copolymer, and 1.0 parts and 12.5 parts, respectively, of the platinum-containing catalyst and of the methylhydrogenpolysiloxane of Example 1. The resulting release agent contained 60 parts of resin copolymer for every 40 parts of methylphenylvinylsiloxane-endblocked polydimethylsiloxane and 2.5 silicon-bonded hydrogen radicals for every silicon-bonded vinyl radical.

The release agent was immediately sprayed onto the shape-forming surfaces of a 60° C. mold having many contours and a volume sufficient to hold approximately 1300 grams of curable high-resiliency polyurethane foam. After a delay of approximately 7 minutes to allow the release agent to cure the mold was filled with high-resiliency polyurethane foam, the mold was closed and the foam was allowed to expand and cure. The mold was then opened, the molded article removed and the mold refilled with high-resiliency polyurethane foam without recoating the mold surfaces. In this fashion over 50 satisfactory molded articles were prepared be-

EXAMPLE 3

Portions of the release agent described in Example 2, except containing no methylene chloride, were applied to the shape-determining surfaces of an epoxy mold and to a polyester mold and were heated at 54° C. for 10 minutes to cure the applied release agent. For comparative purposes a similar epoxy mold and a similar polyester mold were each coated with a commonly used organic wax release agent.

The four coated molds were then lined with a polyester gel coat followed by a polyester-glass fiber mixture. After curing, the molded articles were removed from their molds. The molds that were treated according to the process of this invention provided numerous, easy releases of the molded article without the need for reapplication of the release agent before each molding process. The molds that were coated with the conventional organic wax provided a single, more difficult release of the molded article per application of the wax to the mold. In addition, the molded articles produced by the process of this invention had a glossier gel coat surface than the molded articles produced by the conventional process.

EXAMPLE 4

The release agent of Example 2, further mixed with 0.03 parts of methylbutynol to control the cure time of the composition, was sprayed onto an aluminum mold, 15"×15"×4" deep, and the coated mold was heated at 60° C. for 6 minutes to cure the release agent. The treated mold was then charged with high-resiliency foam and the foam was post cured. The block of cured foam was then pulled out of the mold. The molding process was repeated over 100 times without significant visible change in the releasing surface of the treated mold or of the release force that was needed to pull the molded article from the treated mold.

That which is claimed is:

1. In a process for forming molded articles, said process comprising placing a molding composition in a mold, converting the molding composition to a solid molded article and thereafter separating the solid molded article from the mold, the improvement comprising applying to at least one shape-determining surface of the mold, and thereafter curing, before the molding composition is placed in contact therewith, a curable silicone release composition obtained by mixing components consisting essentially of (I) a polydiorganosiloxane having the general formula $$ViR_2SiO(R_2SiO)_x(RViSiO)_ySiR_2Vi$$

wherein x and y are integers whose sum has an average value sufficient to provide the polydiorganosiloxane with a viscosity at 25° C. of at least 1.0 pascal-seconds, Vi denotes a vinyl radical and each R denotes, independently, a monovalent radical selected from the group consisting of methyl, phenyl and saturated hydrogen radicals having from 2 to 6 carbon atoms, the total number of organic radicals in the polydiorganosiloxane consisting of at least 95 percent methyl radicals and no more than 1 percent vinyl radicals, (II) a xylene-soluble copolymer of $(CH_3)_3SiO_{\frac{1}{2}}$, $(CH_3)_2(CH_2=CH)SiO_{\frac{1}{2}}$ and $SiO_{4/2}$ siloxane units, said copolymer having from 1 to 5 percent by weight of vinyl radicals, based on the weight of the copolymer, and a total of from 0.6 to 1.1 of said $(CH_3)_3SiO_{\frac{1}{2}}$ plus $(CH_3)_2(CH_2=CH)SiO_{\frac{1}{2}}$ siloxane units for every said $SiO_{4/2}$ siloxane unit, (III) a methylhydrogenpolysiloxane, soluble in the mixture of (I) plus (II), and having an average of at least three silicon-bonded hydrogen radicals per molecule, said hydrogen radicals being bonded to separate silicon atoms, and (IV) a catalytic amount of a hydrosilylation catalyst, said components being mixed in sufficient amounts to provide, in the curable silicone release composition, from 10 to 70 parts by weight of (II) for every 100 parts by weight of (I) plus (II) and from 2 to 10 silicon-bonded hydrogen radicals for every silicon-bonded vinyl radical.

2. A process according to claim 1 wherein the polydiorganosiloxane (I) has the average general formula $ViMeRSiO(Me_2SiO)_x(MeViSiO)_ySiRMeVi$.

3. A process according to claim 2 wherein the curable silicone release composition contains from 2 to 5 silicon-bonded hydrogen radicals for every silicon-bonded vinyl radical.

4. A process according to claim 3 wherein the viscosity of the polydiorganosiloxane (I) has a value of at least 25 pascal-seconds at 25° C. and the curable silicone release composition comprises a volatile thinning medium.

5. A process according to claim 1 or 4 wherein the curable silicone release composition has a viscosity of less than 1.0 pascal-seconds at 25° C.

6. A process according to claim 1 or 4 wherein the curable silicone release composition is applied by a spraying process.

7. A process according to claim 1 or 4 wherein the curable silicone release composition is applied to all shape-determining surfaces of the mold.

8. A process according to claim 1 or 4 wherein the molding composition is a liquid, organic molding composition, convertible to the solid state by a chemical curing reaction.

9. A process according to claim 8 wherein the liquid organic molding composition is a polyurethane composition.

10. A process according to claim 8 wherein the liquid organic molding composition is an unsaturated polyester composition.

* * * * *